(12) United States Patent
Palgen

(10) Patent No.: US 7,448,423 B2
(45) Date of Patent: Nov. 11, 2008

(54) TIRE FOR HEAVY MACHINERY INCLUDING AT LEAST THREE HALF-PLIES ON EACH SIDE OF CROWN REINFORCEMENT

(75) Inventor: Marie-Claude Palgen, Lanore (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 35 days.

(21) Appl. No.: 11/101,495

(22) Filed: Apr. 8, 2005

(65) Prior Publication Data

US 2005/0173042 A1  Aug. 11, 2005

Related U.S. Application Data

(63) Continuation of application No. PCT/EP03/11159, filed on Oct. 9, 2003.

(30) Foreign Application Priority Data

Oct. 10, 2002  (FR)  .................................... 02 12625

(51) Int. Cl.
B60C 9/20  (2006.01)
B60C 9/18  (2006.01)

(52) U.S. Cl. ........................ 152/527; 152/526; 152/534; 152/535

(58) Field of Classification Search ......... 152/526–528, 152/534, 535
See application file for complete search history.

(56) References Cited

U.S. PATENT DOCUMENTS

| 4,215,736 | A | 8/1980 | Herbelleau |
| 5,111,864 | A | 5/1992 | Nakano et al. |
| 6,598,639 | B2 | 7/2003 | Comps et al. |
| 7,213,626 | B2 * | 5/2007 | Giraud et al. ............... 152/534 |

FOREIGN PATENT DOCUMENTS

| FR | 2 827 221 A1 * | 1/2003 |
| WO | WO 99/42306 | 8/1999 |
| WO | WO 03/008206 | 1/2003 |

* cited by examiner

Primary Examiner—Adrienne C Johnstone
(74) Attorney, Agent, or Firm—Buchanan Ingersoll & Rooney PC

(57) ABSTRACT

A tire with a radial carcass reinforcement intended to equip a heavy vehicle such as a transport vehicle or construction machinery, the tire having an axial width grater than 37 inches. The tire includes a working crown reinforcement having at least two continuous plies formed from reinforcement elements crossed from one ply to the next, forming with the circumferential direction angles of between 10° and 35°. The working crown reinforcement is supplemented on each side of the circumferential mid-plane by at least three half-plies whose reinforcement elements form with the circumferential direction angles of between 10° and 40°. The half-ply extending axially the most towards the outside is in contact with at least two other working crown half-plies, and the three half-plies radially overlap the axially external ends of at least two continuous working crown plies.

12 Claims, 3 Drawing Sheets

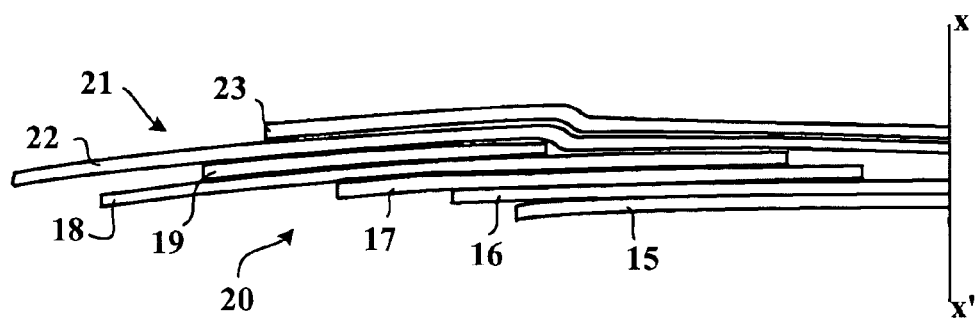
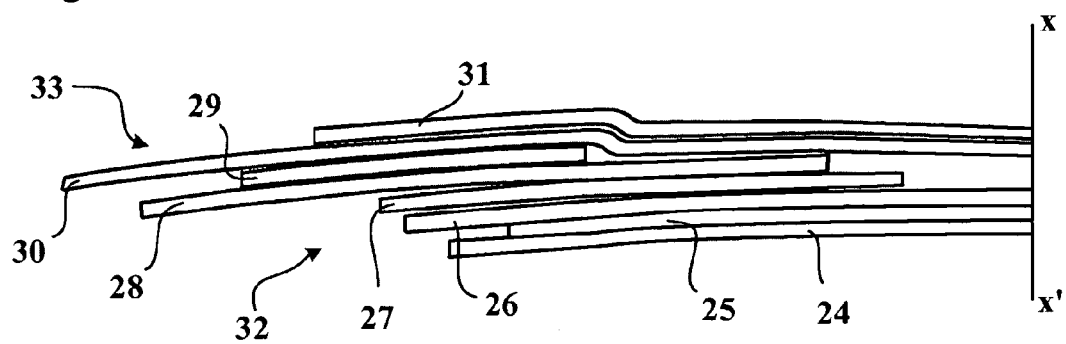
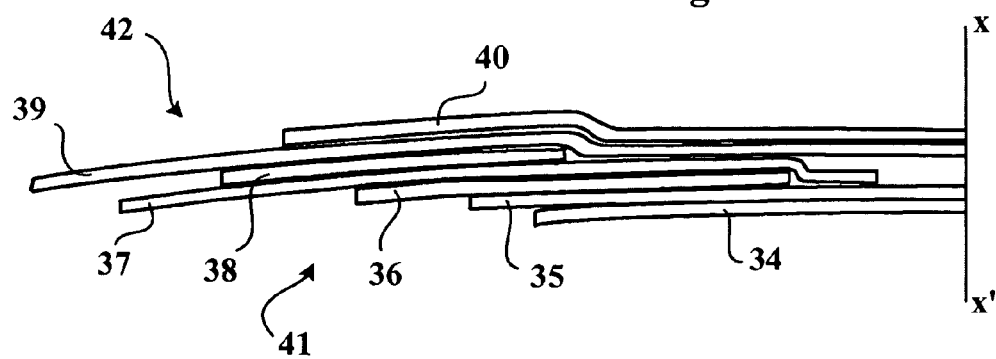

TIRE FOR HEAVY MACHINERY INCLUDING AT LEAST THREE HALF-PLIES ON EACH SIDE OF CROWN REINFORCEMENT

This application is a continuation of International Application Serial No. PCT/EP03/11159 filed on Oct. 9, 2003, which published on Apr. 22, 2004 under WO 2004/033234.

BACKGROUND

The invention concerns a tire with a radial carcass reinforcement intended to equip a heavy vehicle such as a transport vehicle or construction machinery. This is in particular a tire which has an axial width greater than 37 inches.

Such a tire, intended generally to bear heavy loads, comprises a radial carcass reinforcement, and a crown reinforcement composed of at least two working crown plies, formed by non-extensible reinforcement elements, crossed from one ply to the next and forming, with the circumferential direction, equal or unequal angles, lying between 10° and 45°.

The crown reinforcements of radial tires, and more particularly with regard to very large tires, are subjected to great deformation, generating between the edges of two cross-plies longitudinal and transverse shear stresses (the longitudinal shearing is greater than the transverse when the cables of crossed plies form small angles with the circumferential direction), at the same time as a delamination stress, a radial stress having a tendency to radially separate the edges of two plies. The said stresses are due firstly to the inflation pressure of the tire, which means that the so-called belting pressure between carcass reinforcement and crown reinforcement tends to cause the circumferential expansion of the said crown reinforcement. The said stresses are also due to the load carried by the tire in running with the arising of a contact surface between ground and tire. The said stresses are also due to the drifting of the tire during running. These stresses generate cracks in the rubber mix adjacent to the end of the shortest ply, cracks which propagate in the said mix and which are detrimental to the fatigue strength of a crown reinforcement and therefore of the tire.

An appreciable improvement to the fatigue strength has been procured by the use in the crown reinforcement of at least one protective crown ply having an axial width greater than the width of the axially widest working ply.

"Axial" means a direction parallel to the rotation axis of the tire and "radial" means a direction intersecting the rotation axis of the tire and perpendicular thereto. The rotation axis of the tire is the axis about which it turns in normal use. The circumferential mid-plane is a plane perpendicular to the rotation axis of the tire which divides the tire into two halves. A radial plane is a plane which contains the rotation axis of the tire.

Another solution as described in the patent FR 2 421 742 consists of more favorably distributing the stresses generating separation between working crown plies, resulting from the drift of the tire, by multiplying the number of working plies.

Increasing the number of working plies is not without drawback, in particular at the centre of the crown reinforcement where the number of plies has a direct influence on the flexing rigidity of the tire crown. When this rigidity increases, the result is that impacts occurring on the tire crown, such as in particular passing over large pebbles, may result in irremediable damage to the tire, because of this increased rigidity.

Patent application WO 00/54992 also proposed, in order to avoid this drawback, producing a working crown reinforcement consisting of at least three continuous working plies and at least one half-ply, on each side of the circumferential mid-plane, disposed between the edges of at least two radially adjacent continuous working plies, whose particularity is in particular to present an angle to the circumferential direction greater than 25° and greater by a quantity of between 5° and 15° than the largest of the angles of the continuous working plies. The results obtained with this type of architecture were entirely satisfactory for the tire dimensions tested.

In their studies and in particular during the study of the production of tires of larger size, in particular where the axial width is greater than 50 inches, the inventors set themselves the task of defining a tire crown architecture for heavy machinery making it possible to obtain satisfactory fatigue strength, in particular by improving the circumferential and transverse rigidities in order to limit the shear stresses and preserving flexibility of the crown.

SUMMARY OF THE INVENTION

This aim was achieved according to the invention by a tire for heavy machinery, comprising a radial carcass reinforcement surmounted radially by a working crown reinforcement, composed of at least two axially continuous working crown plies formed by reinforcement elements crossed from one ply to the next, forming with the circumferential direction angles $\alpha$, $\alpha'$ of between 10° and 35°, the working crown reinforcement being supplemented on each side of the circumferential mid-plane by at least three half-plies whose reinforcement elements form with the circumferential direction angles $\beta$, $\beta'$, $\beta''$ of between 10° and 40°, the half-ply extending axially furthest towards the outside being in contact with at least two other working crown half-plies and the three half-plies radially cover the radially external ends of at least two continuous working crown plies.

A tire as just defined according to the invention, that is to say possessing a crown reinforcement as described, improves the fatigue strength of the tires for heavy vehicles. It turns out in fact that the architectures proposed reduce the shear stresses whilst preserving flexibility of the tire, particularly at its crown, making it possible to obtain good resistance to impacts, which again promotes the fatigue strength of the tire.

According to a preferred embodiment of the invention, the continuous working crown plies, formed from reinforcement elements oriented with the angles $\alpha$, $\alpha'$, are radially closest to the carcass reinforcement, the widest ply preferably being the closest to the radially external ply of the carcass reinforcement.

The continuous plies and the working crown half-plies are preferably composed of non-extensible metallic reinforcement elements, so as to fulfill the function of hooping of the carcass ply as effectively as possible.

Covering the ends of the continuous crown plies with the half-plies improves the distribution of the forces in the whole of the crown reinforcement by optimizing the coupling of the plies. This coupling is obtained firstly between the continuous plies and the working crown half-plies and secondly between the various working crown half-plies.

Advantageously again, the reinforcement elements of one of the half-plies have an angle greater by at least 10° than the smallest of the angles $\alpha$, $\alpha'$. Such a ply makes it possible in particular to limit the shearing between the reinforcements of the said ply and the shearing with the gums surrounding the said ply and thus to limit the risks of cleaving between the plies. This half-ply is advantageously that whose internal axial end is axially furthest towards the outside; preferably again, this half-ply is the radially outermost half-ply, the cleaving risk areas being situated at the axially external ends of the plies and the ends closest to the tread.

According to a preferred embodiment of the invention, in order to improve the circumferential rigidity of the tire whilst increasing the transverse rigidity, the reinforcement elements of the half-plies are crossed from one ply to the next.

In a manner known per se, in particular in order to improve the resistance of the tire to cuts and perforations, the working crown reinforcement is supplemented by a protective reinforcement. This is advantageously composed of at least two plies of elastic metallic reinforcement elements. Variant embodiments of the invention provide for protective plies consisting of partially overlapping strips. Whatever the type of protective plies used, the elastic reinforcement used can be elements disposed rectilinearly or in sinusoidal form.

At least one of the said protective plies, preferentially the radially innermost ply, has a greater axial width than the greatest axial width of the continuous working plies. Advantageously again, the said protective ply covers all the continuous working plies and the working half-plies.

According to an advantageous variant of the invention, the radially external protective ply has an axially external end lying between the axially external ends of the half-ply extending axially furthest towards the outside and the half-ply extending axially least towards the outside. Advantageously again, the radially external protective ply has an axially external end lying between the axially external ends of the two half-plies extending axially the least towards the outside.

Preferably again, the reinforcement elements of the protective plies are crossed over each other.

In the central part of the crown of the tire, the protective reinforcement can also be supplemented by a complementary protective block radially interposed between the working reinforcement and the protective reinforcement. In other words, this complementary protective block fills in the area lying between the half-plies and radially internal to the protective plies. This complementary protective block can consist of a block of rubber and/or an elastic ply whose reinforcement elements have an angle lying between 20° and 90° and preferably greater than the angle of the reinforcement elements of the radially internal protective ply. Such a complementary protective block advantageously supplements the function of protection against any perforations.

BRIEF DESCRIPTION OF DRAWINGS

Other advantageous details and characteristics of the invention will emerge below from the description of example embodiments of the invention with reference to FIGS. 1 to 5, which depict:

FIG. 2, a schematic representation seen in radial section of a first crown architecture according to the invention, FIG. 3, a schematic representation seen in radial section of a second crown architecture according to the invention, FIG. 4, a schematic representation seen in radial section of a third crown architecture according to the invention, FIG. 5, a schematic representation seen in radial section of a fourth crown architecture according to the invention, FIG. 6, a schematic representation seen in radial section of a fifth crown architecture according to the invention.

DETAILED DESCRIPTION OF PREFERRED EMBODIMENTS

The figures are not shown to scale in order to simplify understanding thereof. FIGS. 2 to 6 show only half of the architectures, which extend symmetrically with respect to the axis XX', which represents the circumferential mid-plane of a tire.

The dimensional values which are given are theoretical values, that is to say it is a question of reference values during the manufacture of the tires; the real values may be slightly different, in particular because of the uncertainty related to the manufacturing process for this type of tire.

In addition, concerning the angles of the reinforcements of the plies, the values given are the minimum values, that is to say the values corresponding to the area of a ply closest to the median axis of the tire. This is because the angle of the said reinforcements varies according to the axial direction of the tire, in particular because of the curve of the latter.

Figure 1:
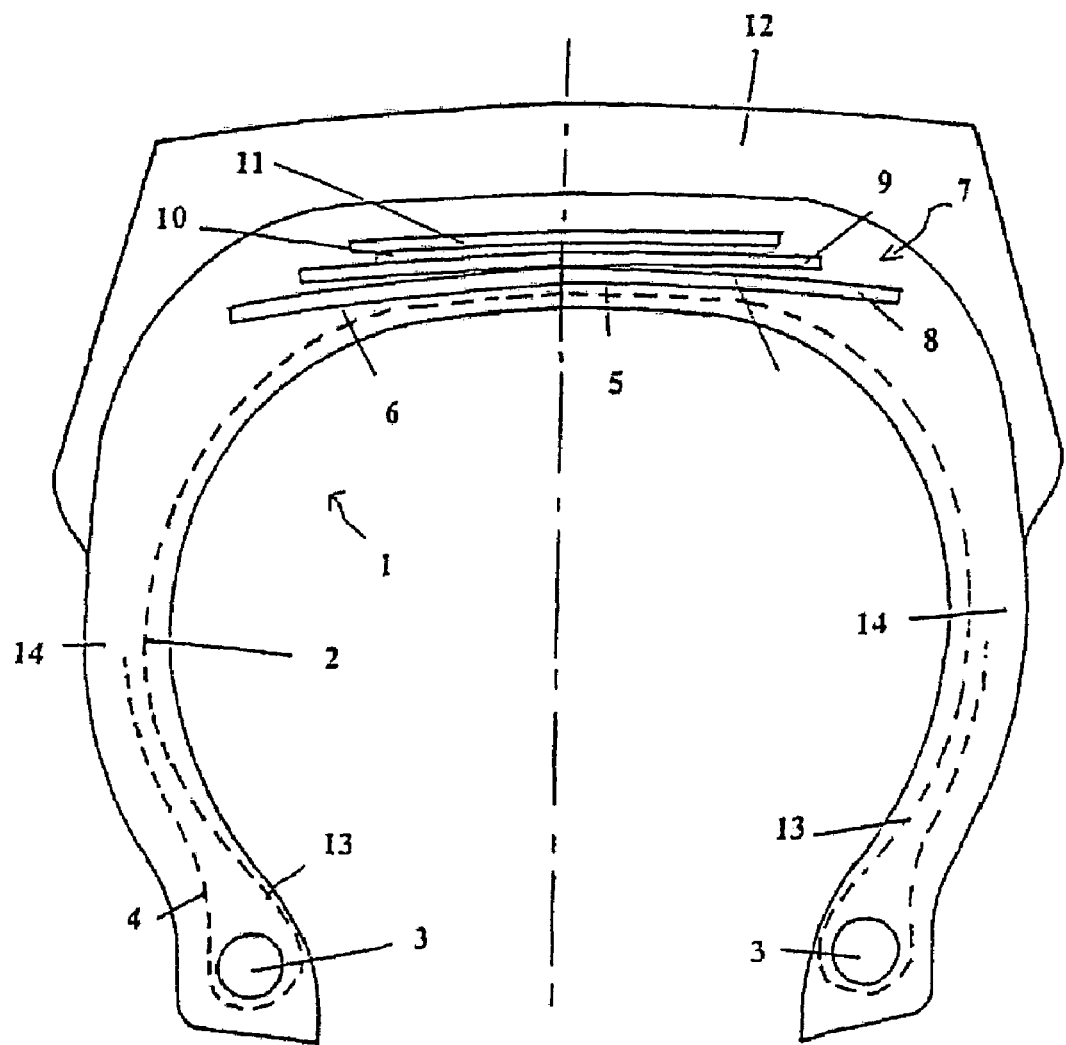
FIG. 1, a diagram seen in radial section of a construction-machinery tire.

FIG. 1 depicts schematically a radial section of a tire 1 normally used for construction equipment.

This tire 1 is a large tire whose form ratio H/S is 0.80, H being the height of the tire on the rim and S the maximum axial width of the tire when the latter is mounted on its service rim and inflated to its recommended pressure.

This tire 1 comprises a carcass reinforcement 2 composed of a ply of non-extensible metallic cables made from steel, anchored in each bead to a bead wire 3 in order to form an upturn 4 whose end is substantially situated at the greatest axial width of the carcass reinforcement 2. The carcass reinforcement 2 is surmounted radially by layers 5 and profiles of rubber mix 6, and then a crown reinforcement 7. The said crown reinforcement 7 is normally formed, in the case in FIG. 1, firstly from two so-called working plies 8, 9 and secondly by two protective plies 10, 11. The working plies 8, 9 consist themselves of non-extensible steel cables, parallel to each other in each ply 8, 9, and crossed from one ply to the next, forming with the circumferential direction angles which may be between 15° and 40°. The protective plies 10, 11 generally consist of elastic metallic cables made from steel, parallel to each other in each ply 10, 11 and crossed over each other from one ply 10 to the next 11, forming angles which may be between 15° and 45°. The cables of the radially external working ply 9 are usually crossed over the cables of the radially internal protective ply 10. Finally, the crown reinforcement is surmounted by a tread 12, which is joined to the two beads 13 by the two sidewalls 14.

FIG. 2 depicts schematically in radial section a stack, according to the invention, of plies 15 to 19 constituting a working crown reinforcement 20 of a tire surmounted by a protective reinforcement 21. The carcass reinforcement and the various areas of rubber mix are not shown in this FIG. 2 and the following ones in order to simplify understanding of the invention.

The working reinforcement 20 thus comprises firstly two axially continuous plies 15 and 16. These plies have respective theoretical widths $L_{15}$, $L_{16}$ of $0.23S_0$ and $0.25S_0$, $S_0$ being the maximum axial width of the carcass reinforcement, when the latter is mounted on its service rim and inflated to its recommended pressure.

These two continuous working plies are formed from non-extensible metallic cables parallel to each other in each ply 15 and 16 crossed from one ply 15 to the next 16, forming with the circumferential direction of the tire minimum theoretical angles $\alpha_{15}$, $\alpha_{16}$, respectively equal to −21° and +21°.

The working crown reinforcement 20 is then supplemented radially by a superimposition of three half-plies 17, 18 and 19. These three half-plies are situated, as explained previously, symmetrically with respect to the circumferential mid-plane XX' on the part of the tire stack which is not shown. These three half-plies also comprise non-extensible metallic cables parallel to each other and crossed from one half-ply to the next with minimum theoretical angles $\beta_{19}$, $\beta_{20}$, and $\beta_{21}$ respectively equal to −15°, +18° and −34°.

The theoretical axial distance which separates the circumferential mid-plane from the internal end of the half-ply 17 least distant from the said circumferential mid-plane is equal to $0.03S_0$.

The other two half-plies 18, 19 are placed so that the theoretical axial distances which separate the circumferential mid-plane from the internal ends of the other two half-plies 18, 19 are respectively equal to $0.08\ S_0$ and $0.20\ S_0$.

The three half-plies 17, 18, 19 extend axially further towards the outside than the axially widest continuous working ply 16 of the continuous working plies and the said three half-plies radially overlap the axially external ends of the two continuous working crown plies 15, 16.

The half-ply 18 extending axially furthest towards the outside is positioned radially between the other two half-plies 17, 19 and is in contact with the said other two half-plies 17, 19.

Moreover, according to this embodiment in FIG. 2, the half-ply 17, which is the only one to be directly in contact with a continuous working ply 16, comprises cables which are crossed over those of the said continuous ply 16.

The areas of overlap between the half-plies 17, 18, 19 and the continuous working plies 15, 16, including that between the half-ply 19 and the least extended axially continuous working ply 15, are sufficiently great to provide continuity of forces.

The protective reinforcement 21 which radially covers the working crown reinforcement 20 is formed from two plies 22, 23 comprising elastic steel cables. The term elastic is given to cables having, under a tensile force equal to the rupture load, a relative elongation of at least 4%, whilst cables are said to be non-extensible when their relative elongation, measured for 10% of the rupture force, is less than 0.2%. The cables of the said two plies are crossed from one ply 22 to the other 23, forming with the circumferential direction minimum theoretical angles of respectively −24° and +24°. The cables in the protective ply 22 closest radially to the working reinforcement are crossed over the cables of the working half-ply 19 furthest away radially from the carcass reinforcement.

The axial width of the widest protective ply 22 is such that it covers the axial width of the working reinforcement 20; that is to say it covers radially according to its axial extent all the working plies. In other words the end of the widest protective ply 22 is axially to the outside of the half-ply 18.

The axially external end of the least wide protective ply 23 lies between the axially external ends of the half-plies 17, 19 extending axially the least towards the outside.

The invention provides, according to other variant embodiments, for reversing the radial order of the two protective plies, the cables of the said plies remaining crossed over each other. Reversing the order of the two protective plies according to the invention means that the invention makes provision for reversing the widths and/or the angles of the said protective plies. In other words, the radially internal protective ply can comprise cables oriented in the direction of the cables of the working half-ply 19 furthest away from the carcass reinforcement. Moreover, the radially internal protective ply can be the axially narrowest protective ply.

FIG. 3 illustrates a schematic representation seen in radial section of a second crown reinforcement architecture according to the invention. According to this second illustration of the invention, the stack comprises plies 24 to 29 constituting a working crown reinforcement 32 of a tire surmounted by a protective reinforcement 33.

The working crown reinforcement 32 comprises three axially continuous plies 24, 25 and 26. These plies have respectively theoretical widths $L_{24}$, $L_{25}$, $L_{26}$ equal to $0.30S_0$ and $0.25S_0$, $0.40S_0$, $S_0$ being as stated previously the maximum axial width of the carcass reinforcement when the latter is mounted on its service rim and inflated to its recommended pressure.

These three continuous working plies are formed from non-extensible metallic cables parallel to each other in each ply 24 to 26 and crossed from one ply to the next, forming with the circumferential direction of the tire minimum theoretical angles $\alpha_{24}$, $\alpha_{25}$ and $\alpha_{26}$, respectively equal to +18°, −21°, +21°.

The working crown reinforcement 32 is then supplemented radially by a superimposition of three half-plies 27, 28, 29. These three half-plies are situated as before symmetrically with respect to the circumferential mid-plane on the part of the tire stack which is not shown. These three half-plies also comprise non-extensible metallic cables parallel to each other and crossed from one ply to the next with minimum theoretical angles $\beta_{27}$, $\beta_{28}$, $\beta_{29}$ respectively equal to −15°, +18° and −34°.

The theoretical axial distance which separates the circumferential mid-plane from the internal end of the half-ply 27 least distant from the said circumferential mid-plane is equal to $0.10S_0$.

The other two half-plies 28, 29 are placed so that the theoretical axial distances which separate the circumferential mid-plane from the internal ends of the other two half-plies 28, 29 are respectively equal to $0.13\ S_0$ and $0.20\ S_0$.

The protective reinforcement 33 which radially covers the working crown reinforcement 32 is identical to that of FIG. 2 and consists of plies 30, 31.

In comparison with FIG. 2, the architecture of FIG. 3 proposes three continuous working plies 24, 25, 26. This distance makes it possible to increase the hooping at the centre of the tire. The flexibility of the crown at the centre is reduced according to this representation by the fact that the half-plies 27, 28, 29 are further away from the circumferential mid-plane than the half-plies 17, 18, 19 in FIG. 2. The flexibility of the crown at the centre obtained according to the crown reinforcement architecture of FIG. 3 is all the same less than that obtained according to the crown reinforcement architecture of FIG. 2.

FIG. 4 illustrates a schematic representation seen in radial section of a third crown reinforcement architecture according to the invention. According to this third illustration of the invention, the stack comprises plies 34 to 38 constituting a working crown reinforcement 41 of a tire surmounted by a protective reinforcement 42.

The working crown reinforcement 41 comprises two axially continuous plies 34, 35. These plies have respective theoretical widths $L_{34}$, $L_{35}$ equal to $0.23S_0$ and $0.25S_0$, $S_0$ being as stated before the maximum axial width of the carcass reinforcement when the latter is mounted on its service rim and inflated to its recommended pressure.

These two continuous working plies 34, 35 are formed from non-extensible metallic cables parallel to each other in each ply and crossed from one ply to the next, forming with the circumferential direction of the tire minimum theoretical angles $\alpha_{34}$, $\alpha_{35}$ respectively equal to −21°, +21°.

The working crown reinforcement 41 is then supplemented radially by a superimposition of three half-plies 36, 37, 38. These three half-plies are situated as before symmetrically with respect to the circumferential mid-plane on the part of the tire stack which is not shown. These three half-plies also comprise non-extensible metallic cables parallel to each other and crossed from the ply 36 to the ply 38 with minimum theoretical angles $\beta_{36}$, $\beta_{37}$, $\beta_{38}$ respectively equal to −15°, +18° and −34°.

The theoretical axial distance which separates the circumferential mid-plane from the internal end of the half-ply 37 the least distant from the said circumferential mid-plane is equal to $0.05S_0$.

The other two half-plies 36, 38 are put in place so that the theoretical axial distances which separate the circumferential mid-plane from the internal ends of the said other two half-plies 36, 39 are respectively equal to $0.10S_0$ and $0.20\ S_0$.

The protective reinforcement 42 which radially covers the working crown reinforcement 41 is identical to that of the previous figures and consists of the plies 39, 40.

The difference in architecture in FIG. 4 compared with FIG. 2 has in particular the effect of increasing the coupling surface between the continuous working plies and the working half-plies 37, extending axially furthest towards the outside. This increase in the coupling surfaces between the plies confers on the tire greater resistance to drift forces.

Figure 5:
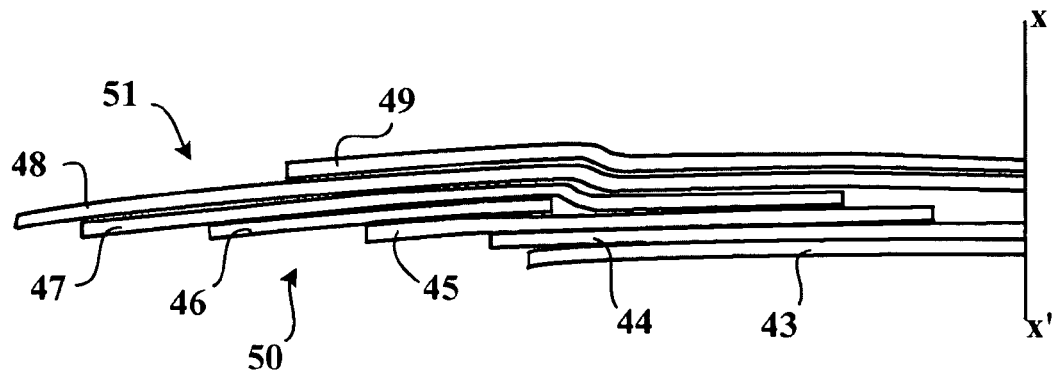

FIG. 5 illustrates a schematic representation seen in radial section of a fourth crown reinforcement architecture according to the invention. According to this fourth illustration of the invention, the stack comprises plies 43 to 47 constituting a working crown reinforcement 50 of a tire surmounted by a protective reinforcement 51.

The working crown reinforcement 50 comprises two axially continuous plies 43, 44. These plies have respective theoretical widths $L_{43}$, $L_{44}$ equal to $0.23S_0$ and $0.25S_0$, $S_0$ being as stated before the maximum axial width of the carcass reinforcement when the latter is mounted on its service rim and inflated to its recommended pressure.

These two continuous working plies 43, 44 are formed from non-extensible metallic cables parallel to each other in each ply and crossed from one ply to the next, forming with the circumferential direction of the tire minimum theoretical angles $\alpha_{43}$, $\alpha_{44}$ respectively equal to −21°, +21°.

The working crown reinforcement 50 is then supplemented radially by a superimposition of three half-plies 45, 46, 47. These three half-plies are situated as before symmetrically with respect to the circumferential mid-plane on the part of the tire stack which is not shown. These three half-plies also comprise non-extensible metallic cables parallel to each other and crossed from one ply to the next with minimum theoretical angles $\beta_{45}$, $\beta_{46}$, $\beta_{47}$ respectively equal to −15°, +34° and −18°.

The theoretical axial distance separating the circumferential mid-plane from the internal end of the half-ply 45 least furthest away from the said circumferential mid-plane is equal to $0.05S_0$.

The other two half-plies 46, 47 are placed so that the theoretical axial distances separating the circumferential mid-plane from the internal ends of the said other two half-plies 46, 47 are respectively equal to $0.20\ S_0$ and $0.10\ S_0$.

The protective reinforcement 51 which radially covers the working crown reinforcement 50 is identical to that of the previous figures and consists of the plies 48, 49.

The invention advantageously provides according to this embodiment for the placing of a decoupling gum between the half-ply 47 and the protective ply 48 since the ends of the cables of the half-ply 47 are in a highly stressed area.

The difference in architecture in FIG. 5 compared with the previous representations makes it possible to achieve coupling between the working half-plies in pairs. Such an architecture in particular improves the adhesion of the half-plies to each other.

Figure 6:
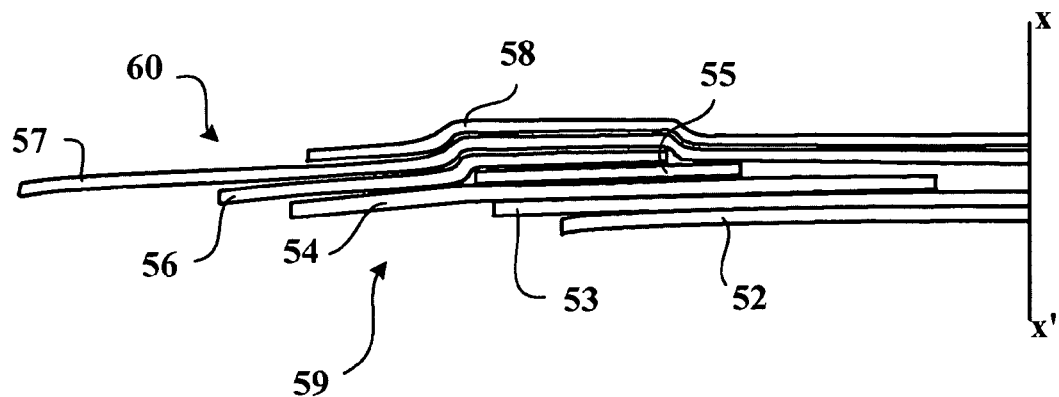

FIG. 6 illustrates a schematic representation seen in radial section of a fifth crown reinforcement architecture according to the invention. According to this fifth illustration of the invention, the stack comprises plies 52 to 56 constituting a working crown reinforcement 59 of a tire surmounted by a protective reinforcement 60.

The working crown reinforcement 59 comprises two axially continuous plies 52, 53. These plies have respective theoretical widths $L_{52}$, $L_{53}$ equal to $0.23S_0$ and $0.25S_0$, $S_0$ being as stated before the maximum axial width of the carcass reinforcement when the latter is mounted on its service rim and inflated to its recommended pressure.

These two continuous working plies 52, 53 are formed from non-extensible metallic cables parallel to each other in each ply and crossed from one ply to the next, forming with the circumferential direction of the tire minimum theoretical angles $\alpha_{52}$, $\alpha_{53}$ respectively equal to −21°, +21°.

The working crown reinforcement 59 is then supplemented radially by a superimposition of three half-plies 54, 55, 56. These three half-plies are situated as before symmetrically with respect to the circumferential mid-plane on the part of the tire stack which is not shown. These three half-plies also comprise non-extensible metallic cables parallel to each other and crossed from one ply to the next with minimum theoretical angles $\beta_{54}$, $\beta_{55}$, $\beta_{56}$ respectively equal to −15°, +20° and −32°.

The theoretical axial distance separating the circumferential mid-plane from the internal end of the half-ply 54 least furthest away from the said circumferential mid-plane is equal to $0.05S_0$.

The other two half-plies 55, 56 are placed so that the theoretical axial distances separating the circumferential mid-plane from the internal ends of the said other two half-plies 55, 56 are respectively equal to $0.15\ S_0$ and $0.18\ S_0$.

The protective reinforcement 60 which radially covers the working crown reinforcement 50 is identical to that of the previous figures and consists of the plies 57, 58.

The difference in architecture in FIG. 6 compared with the previous representations makes it possible, as in the case of the architecture depicted in FIG. 5, to effect a coupling between the working half-plies in pairs. Such an architecture therefore in particular, as in the case in FIG. 5, improves the adhesion of the half-plies to each other.

These examples must not be interpreted limitingly, the variant embodiments being numerous; it is in particular possible to make provision for interposing working half-plies between continuous working plies. It is also possible to have a greater number of continuous working plies. It can also be envisaged reversing the orientation of the cables of the protective plies.

The invention claimed is:

1. Tire for heavy machinery, comprising a radial carcass reinforcement surmounted radially by a working crown reinforcement, the working crown reinforcement comprising at least two axially continuous working crown plies formed by non-extensible metallic reinforcement elements crossed from one ply to the next, forming with the circumferential direction respective first angles of between 10° and 35°, wherein the working crown reinforcement is supplemented on each side of the circumferential mid-plane by at least three half-plies formed by non-extensible metallic reinforcement elements forming with the circumferential direction respective second angles of between 10° and 40°, wherein the half-ply extending axially furthest towards the outside is in contact with at least two other working crown half-plies and wherein each of the three half-plies radially cover the axially external ends of at least two continuous working crown plies.

2. Tire according to claim 1, wherein the continuous plies formed from the reinforcement elements oriented with the first angles are radially the closest to the carcass reinforcement, the least wide ply preferably being the closest to the radially external ply of the carcass reinforcement.

3. Tire according to claim 1, wherein the reinforcement elements of one of the half-plies have an angle greater by at least 10° than the smallest of the first angles.

4. Tire according to claim 1, wherein the reinforcement elements of the half-plies are crossed from one half-ply to the next.

5. Tire according to claim 1, wherein the working crown reinforcement is supplemented by a protective reinforcement composed of at least two plies of elastic metallic reinforcement elements.

6. Tire according to claim 5, wherein a protective ply has an axial width greater than the width of the axially widest working ply.

7. Tire according to claim 5, wherein the radially external protective ply has an axially external end lying between the axially external ends of the half-ply extending axially most towards the outside and the half-ply extending least towards the outside.

8. Tire according to claim 7, wherein the radially external protective ply has an axially external end lying between the axially external ends of the two half-plies extending axially the least towards the outside.

9. Tire according to claim 1 wherein the tire has an axial width greater than 37 inches.

10. Tire for heavy machinery, comprising a radial carcass reinforcement surmounted radially by a working crown reinforcement, composed of at least two axially continuous working crown plies formed by reinforcement elements crossed from one ply to the next, forming with the circumferential direction angles of between 10° and 35°, wherein the working crown reinforcement is supplemented on each side of the circumferential mid-plane by at least three half-plies whose reinforcement elements form with the circumferential direction angles of between 10° and 40°, wherein the half-ply extending axially furthest towards the outside is in contact with at least two other working crown half-plies and wherein each of the three half-plies radially covers the axially external ends of at least two continuous working crown plies, wherein the working crown reinforcement is supplemented by a protective reinforcement composed of at least two plies of elastic metallic reinforcement elements, wherein the radially external protective ply has an axially external end lying between the axially external ends of the half-ply extending axially most towards the outside and the half-ply extending least towards the outside.

11. Tire according to claim 10, wherein the radially external protective ply has an axially external end lying between the axially external ends of the two half-plies extending axially the least towards the outside.

12. Tire according to claim 11, wherein the axial width of the tire is greater than 37 inches.

* * * * *